(12) United States Patent
Wakasa (10) Patent No.: US 10,606,529 B2
(45) Date of Patent: Mar. 31, 2020

(54) PRINTER AND METHOD FOR CONTROLLING PRINTER

(71) Applicant: SEIKO EPSON CORPORATION, Tokyo (JP)

(72) Inventor: Shunichi Wakasa, Chikuma (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/256,244

(22) Filed: Jan. 24, 2019

(65) Prior Publication Data

US 2019/0235808 A1 Aug. 1, 2019

(30) Foreign Application Priority Data

Jan. 26, 2018 (JP) ................. 2018-011333

(51) Int. Cl.
*H04N 1/00* (2006.01)
*G06F 3/12* (2006.01)

(52) U.S. Cl.
CPC ............ *G06F 3/1235* (2013.01); *G06F 3/121* (2013.01); *H04N 1/00408* (2013.01)

(58) Field of Classification Search
CPC .... G06F 3/1235; G06F 3/121; H04N 1/00408
USPC ...................................................... 358/1.14
See application file for complete search history.

(56) References Cited

U.S. PATENT DOCUMENTS

| 2005/0024411 A1* | 2/2005 | Takenouchi | ............... B41J 3/60 347/16 |
| 2007/0160403 A1* | 7/2007 | Akimoto | .................... B41J 3/46 400/82 |

FOREIGN PATENT DOCUMENTS

JP 2013-052571 A 3/2013

* cited by examiner

*Primary Examiner* — Saeid Ebrahimi Dehkordy
(74) *Attorney, Agent, or Firm* — Foley & Lardner LLP (57) ABSTRACT

A composite processing device includes a check printing mechanism and a roll printing mechanism and executes printing using selected one of the printing mechanisms by a command. The composite processing device includes a sensor that detects whether the check printing mechanism and the roll printing mechanism are in a enabled state or a disabled state, and a processor causes a display to display check printing mechanism state information and roll printing mechanism state information based on results of the detection by the sensor. When the check printing mechanism is selected and is in the enabled state, the processor causes the display to display the check printing mechanism state information and the roll printing mechanism state information. When the check printing mechanism is selected and is in the disabled state, the processor causes the display to display information on the disabled state of the check printing mechanism.

10 Claims, 8 Drawing Sheets

PRINTER AND METHOD FOR CONTROLLING PRINTER

This application claims priority under 35 U.S.C. § 119 to Japanese Patent Application No. 2018-11333 filed on Jan. 26, 2018, the entire disclosure of which is expressly incorporated by reference herein.

BACKGROUND

1. Technical Field

The present invention relates to a printer and a method for controlling a printer.

2. Related Art

For a printer having multiple printing units, a technique for outputting information on the states of the printing units is traditionally known (refer to, for example, JP-A-2013-52571). JP-A-2013-52571 discloses a technique for causing a printing unit other than a printing unit from which an error has been detected to print error information of the printing unit from which the error has been detected and causing a liquid crystal display to display the error information.

A configuration described in JP-A-2013-52571, however, has a problem that when a certain printing unit is in an error state, error information of the certain printing unit is displayed by the liquid crystal display, and another printing unit is selected as a printing unit for executing printing, information on the other printing unit is not displayed by the liquid crystal display.

SUMMARY

An advantage of some aspects of the invention is to appropriately display information on a printing mechanism in a printer including multiple printing mechanisms.

An aspect of the invention is directed to a printer that includes a first printing mechanism capable printing on a first media and a second printing mechanism capable printing on a second media different from the first media and is configured to execute printing using selected one of the first and second printing mechanisms by a command from a host computer. The printer includes a display configured to display information and a processor configured to determine whether the first printing mechanism and the second printing mechanism are in a printing enabled state or a printing disabled state and to cause the display to display first printing mechanism state information indicating the state of the first printing mechanism and second printing mechanism state information indicating the state of the second printing mechanism based on results of the determination. When the first printing mechanism is selected by the command and is in the printing enabled state, the processor causes the display to display the first printing mechanism state information and the second printing mechanism state information. When the first printing mechanism is selected by the command and is in the printing disabled state, the processor causes the display to display information on the printing disabled state of the first printing mechanism.

According to the aspect of the invention, the printer enables information, which is to be displayed by the display and indicates the printing mechanisms, to vary based on the state of a selected printing mechanism, and the printer including the multiple printing mechanisms can appropriately display information on the printing mechanisms.

In the aspect of the invention, the printing disabled state may include a recovery enabled state and a recovery disabled state. When the first printing mechanism or the second printing mechanism is in the recovery disabled state, the processor may cause the display to display information on the recovery disabled state of the first or the second printing mechanism, regardless of whether the first printing mechanism or the second printing mechanism is selected by the command.

According to the aspect of the invention, since the display displays the information on the recovery disabled state, regardless of whether the first printing mechanism or the second printing mechanism is selected, the printer enables a user to reliably recognize the information on the recovery disabled state.

In the aspect of the invention, the information on the printing disabled state may be information on resolution of the printing disabled state.

According to the aspect of the invention, when the first printing mechanism is in the printing disabled state, the information on the resolution of the printing disabled state is displayed, and the printer can support the user so that the user can quickly resolve the printing disabled state.

In the aspect of the invention, the first printing mechanism state information may be first consumable state information indicating the state of a first consumable to be consumed for printing by the first printing mechanism, and the second printing mechanism state information may be second consumable state information indicating the state of a second consumable to be consumed for printing by the second printing mechanism.

According to the aspect of the invention, since the first printing mechanism state information is the first consumable state information, and the second printing mechanism state information is the second consumable state information, the user can recognize the states (for example, the presence or absence of the consumables) of the consumables.

Another aspect of the invention is directed to a method for controlling a printer including a first printing mechanism capable printing on a first media and a second printing mechanism capable printing on a second media different from the first media. The method includes selecting any of the first printing mechanism and the second printing mechanism by a command from a host computer so that printing is to be executed by the selected printing mechanism; determining whether the first printing mechanism and the second printing mechanism are in a printing enabled state or a printing disabled state; causing a display to display first printing mechanism state information indicating the state of the first printing mechanism and second printing mechanism state information indicating the state of the second printing mechanism when the first printing mechanism is selected by the command and is in the printing enabled state; and causing the display to display information on the printing disabled state of the first printing mechanism when the first printing mechanism is selected by the command and is in the printing disabled state.

According to the other aspect of the invention, the printer enables information, which is to be displayed by the display and indicates the printing mechanisms, to vary based on the state of a selected printing mechanism by the command, and the printer including the multiple printing mechanisms can appropriately display information on a printing mechanism.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
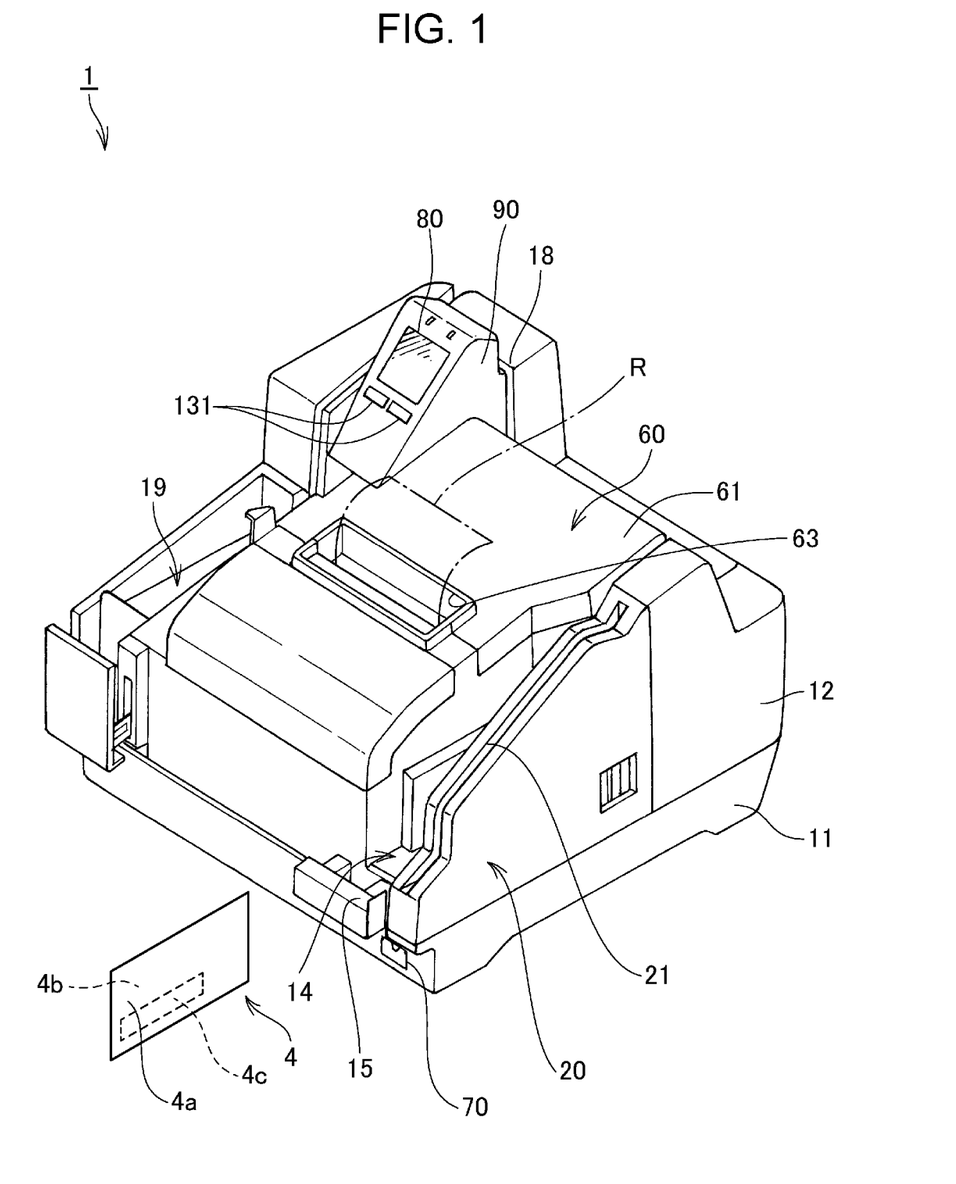
FIG. 1 is an external perspective view of a composite processing device.

FIG. 1 is an external perspective view of a composite processing device 1.

An embodiment of the invention is described below using the composite processing device 1 as a printer having multiple printing mechanisms as an example. The composite processing device 1 reads magnetic ink characters recorded on an object (medium to be read) to be read, optically reads both surfaces of the object, and executes printing on the object. The object is a sheet-shaped check 4, a ledger sheet, or the like. The composite processing device 1 has, as a reader, a function of reading magnetic information recorded in a card-shaped medium such as a credit card. In addition, the composite processing device 1 prints characters, images, and the like on a roll sheet R (first consumable or second consumable), cuts the roll sheet R, and issues pieces of the roll sheet R on which the characters, the images, and the like have been printed.

The embodiment exemplifies a check 4 as an object to be read. The check 4 is a ledger sheet obtained by recording a money amount, a check issuer, a serial number, a signature, and the like on a sheet on which a predetermined pattern and a decorative pattern have been printed. The money amount, the check issuer, the serial number, the signature, and the like exist on a front surface 4a of the check 4, while an endorsement column exists on a back surface 4b of the check 4. A predetermined character for endorsement or an image for endorsement is printed in the endorsement column by an ink jet head 10 (refer to FIG. 2) described later. A magnetic ink character string 4c extending in a longitudinal direction of the check 4 is formed on the front surface 4a of the check 4. The magnetic ink character string 4c is obtained by arranging multiple magnetic ink characters printed with magnetic ink and can be magnetically or optically read.

The roll sheet R is a thermal sheet that is colored by heating. The composite processing device 1 uses a thermal head 65 (refer to FIG. 3) described later to heat a printing surface of the roll sheet R, thereby printing a character or an image on the printing surface of the roll sheet R.

The composite processing device 1 includes an exterior portion having a lower case 11 for covering a lower portion of a body 13 of the composite processing device 1 and a cover 12 to be set on the lower case 11. The body 13 (refer to FIG. 2) is stored in the exterior portion. The composite processing device 1 has an insertion slot 14 that is open in a front surface of the composite processing device 1 and into which the check 4 is to be inserted. The composite processing device 1 has a stocker 15 at the rear of the insertion slot 14. Multiple checks 4 can be stacked and stored in the stocker 15. The stocker 15 can be extracted toward the side of the front surface. The composite processing device 1 also has a power source switch 70 on a front surface of the lower case 11. The power source switch 70 is a mechanical switch having a mechanical mechanism for switching between a power conductive state and a power non-conductive state, for example.

A slit 18 that serves as a transport path W (refer to FIG. 2) for checks 4 is included in the cover 12 and formed in a U shape when the cover 12 is viewed from the upper side of the composite processing device 1. The slit 18 communicates with the stocker 15 and a pocket 19 located on the side of the front surface of the composite processing device 1. Checks 4 stored in the stocker 15 are drawn toward the inside of the composite processing device 1 and processed during the time when the checks 4 pass through the slit 18. The checks 4 after the processing are discharged into the pocket 19. The pocket 19 can store multiple checks 4.

The cover 12 has a holder 90 holding a display 80 and upwardly extending from the cover 12 on the back side of the pocket 19 and the inner side of the transport path W (or the side of a sheet discharge slot 63). The display 80 is held by the holder 90 so that a user can visually recognize the display 80. The holder 90 has two operation switches 131 located under the display 80.

As shown in FIG. 1, a magnetic card reader unit 20 is arranged on one side of the stocker 15. The magnetic card reader unit 20 includes a card slit 21 formed in the cover 12 and a magnetic card reader/magnetic stripe reader head 22 (hereinafter referred to as MCR head 22) (refer to FIG. 3) corresponding to the card slit 21. The MCR 22 reads information magnetically recorded in a card passing through the card slit 21.

Figure 2:
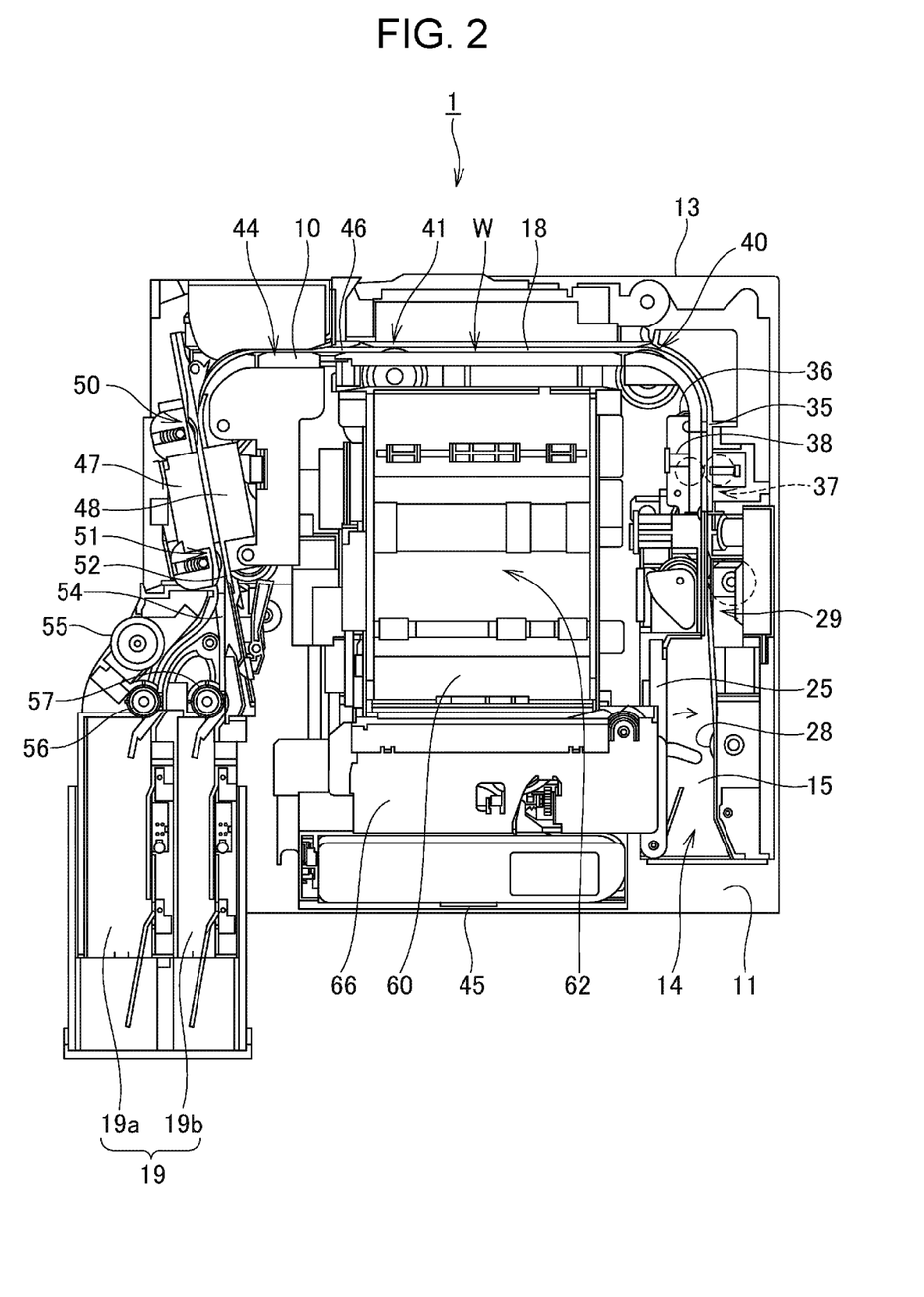
FIG. 2 is a plan view of a configuration of a body of the composite processing device.

FIG. 2 is a plan view of a configuration of the body 13 stored in the exterior portion of the composite processing device 1.

A hopper 25 is arranged in a side surface of the stocker 15. The hopper 25 is rotationally moved by a hopper driving motor 26 (refer to FIG. 3) in a direction indicated by an arrow in FIG. 2 and propels a check 4 stored in the stocker 15 toward another side surface of the stocker 15.

A pickup roller 28 that is driven by an automatic sheet feeder (ASF) motor 27 (refer to FIG. 3) described later is arranged in the other surface of the stocker 15. When the hopper 25 is rotationally moved toward the pickup roller 28, one of checks 4 stored in the stocker 15 is propelled toward the pickup roller 28 due to the rotational movement of the hopper 25, contacts the pickup roller 28, and is drawn into the transport path W due to the rotation of the pickup roller 28.

An ASF roller 29 composed of a pair of rollers is arranged at the rear of the stocker 15. The two rollers of the ASF roller 29 are arranged on both sides of the transport path W. One of the two rollers is rotated by power of the ASF motor 27 described later, while the other of the rollers is a driven roller. The check 4 that has contacted the pickup roller 28 is pinched by the ASF roller 29 and transported toward a downstream side in the slit 18.

An ASF sheet detector 31 (refer to FIG. 3) is arranged at a predetermined position in the stocker 15. The ASF sheet detector 31 is, for example, a transmissive optical sensor and is configured to detect whether or not a check 4 exists in the stocker 15.

A hopper position detector 32 (refer to FIG. 3) is arranged at a standby position of the hopper 25 in the stocker 15. The hopper position detector 32 is, for example, a transmissive optical sensor and is configured to detect whether or not the hopper 25 is positioned at the standby position.

A magnetic ink character recognition (MICR) head 35 that magnetically reads the magnetic ink character string 4*c* while contacting a front surface 4*a* of a check 4 is arranged on the downstream side of the ASF roller 29. An MICR roller 36 is arranged opposite to the MICR head 35. The MICR roller 36 is propelled toward the MICR head 35 and rotated while pushing a check 4 toward the MICR head 35 and transports the check 4 at a speed suitable for the reading of the magnetic ink character string 4*c*. An assist roller 37 composed of a pair of rollers and configured to guide a check 4 fed by the ASF roller 29 to the MICR head 35 is arranged on an upstream side of the MICR head 35.

A sheet length detector 38 is arranged between the assist roller 37 and the MICR head 35. The sheet length detector 38 is, for example, a reflective optical sensor and is configured to detect front and rear edges of a check 4 by detecting whether or not the check 4 passes through the transport path W at a detection position of the sheet length detector 38. Values detected by the sheet length detector 38 are acquired by a controller (processor) 100 (refer to FIG. 3) described later, and a length of the check 4 is calculated based on the difference between the detected values.

A first transport roller 40 having a pair of rollers that are arranged opposite to each other and between which the transport path W exists is arranged on the downstream side of the MICR head 35. A second transport roller 41 is arranged on the downstream side of the first transport roller 40. The first transport roller 40 and the second transport roller 41 are rotationally driven by a transport motor 42 (refer to FIG. 3). The check 4 is transported by the rollers 40 and 41 to an ink jet printer unit (first printing mechanism or second printing mechanism) 44.

The ink jet printer unit 44 includes an ink jet head 10. The ink jet head 10 receives ink supplied from an ink cartridge 45 stored in a front portion of the body 13 and discharges the ink onto a check 4. The ink jet head 10 is a so-called line ink jet head and is configured to discharge the ink onto a back surface 4*b* of the check 4 transported at a constant speed and print an image on the back surface 4*b* of the check 4 upon the printing executed on the check 4. The image printed on the back surface 4*b* of the check 4 is a character, a symbol, or the like, which is called an endorsement.

An intermediate detector 46 is arranged between the ink jet head 10 and the second transport roller 41 on the upstream side of the ink jet head 10. The intermediate detector 46 is, for example, a reflective optical sensor and is configured to detect a check 4 at a detection position of the intermediate detector 46.

A contact image sensor (CIS) unit configured to optically read a check 4 is arranged on the downstream side of the ink jet head 10. The CIS unit includes a front surface CIS unit 47 configured to read a front surface 4*a* of a check 4 and a back surface CIS unit 48 configured to read a back surface 4*b* of the check 4. Thus, the CIS unit can optically read both surfaces of the check 4. The front surface CIS unit 47 and the back surface CIS unit 48 are arranged opposite to each other, while the transport path W exists between the front surface CIS unit 47 and the back surface CIS unit 48. A first CIS roller 50 is arranged on the upstream side of the CIS unit, while a second CIS roller 51 is arranged on the downstream side of the CIS unit. The first CIS roller 50 and the second CIS roller 51 are rotationally driven by the transport roller 42 and stably transport the check 4 being read by the CIS unit.

A discharge detector 52 is arranged on the downstream side of the second CIS roller 51. The discharge detector 52 is, for example, a reflective optical sensor and is configured to detect whether or not a check 4 exists at a detection position of the discharge detector 52.

The pocket 19 is arranged on the downstream side of the front surface CIS unit 47 and the back surface CIS unit 48. The pocket 19 is divided into a main pocket 19*a* and a sub-pocket 19*b*. The slit 18 that forms the transport path W is branched into portions that communicate with the main pocket 19*a* and the sub-pocket 19*b*, respectively. Each of the main pocket 19*a* and the sub-pocket 19*b* can store multiple checks 4.

A switching plate 54 for switching the pocket 19 into which checks 4 are discharged between the main pocket 19*a* and the sub-pocket 19*b* is arranged at a position where the slit 18 is branched. The switching plate 54 is a guide for blocking one of a path communicating with the main pocket 19*a* and a path communicating with the sub-pocket 19*b* and for guiding a check 4 to the other of the paths. The switching plate 54 is driven by a switching plate driving motor 55. A discharge roller 56 is arranged in the path extending from the switching plate 54 to the main pocket 19*a*, while a discharge roller 57 is arranged in the path extending from the switching plate 54 to the sub-pocket 19*b*. Each check 4 is guided by the switching plate 54 and discharged into any of the pockets 19*a* and 19*b* by any of the discharge rollers 56 and 57.

When the composite processing device 1 determines, based on a result of reading the magnetic ink character string 4*c* by the MICR head 35, that the check 4 is properly set, the composite processing device 1 discharges the check 4 into the main pocket 19*a*. When the composite processing device 1 determines, based on the result of reading the magnetic ink character string 4*c* by the MICR head 35, that the check 4 is not properly set, the composite processing device 1 discharges the check 4 into the sub-pocket 19*b*.

As shown in FIGS. 1 and 2, a thermal printer unit (first printing mechanism or second printing mechanism) 60 for issuing sheet pieces on which characters, images, and the like have been printed is arranged in a central portion of the composite processing device 1.

As shown in FIG. 1, the thermal printer unit 60 includes a printer cover 61 for covering an upper portion of a body of the thermal printer unit 60. The printer cover 61 is attached to the cover 12 so that the printer cover 61 is openable and closable. When the printer cover 61 is opened, a roll sheet storage region 62 that is a space capable of storing a roll sheet R is exposed so that the roll sheet R can be set, replaced, or the like. In a state in which the printer cover 61 is closed, the roll sheet R stored in the roll sheet storage region 62 is discharged to the outside of the composite processing device 1 via a sheet discharge slot 63 formed at a front edge of the printer cover 61.

The thermal printer unit 60 includes a platen (not shown) for transporting the roll sheet R stored in the roll sheet storage region 62 in the transport path, a thermal head 65

(refer to FIG. 3) arranged opposite to the platen, and a cutter unit 66 arranged on the downstream side of the thermal head 65 and configured to cut the roll sheet R in a direction perpendicular to a transport direction. The thermal printer unit 60 drives the platen to cause the platen to transport the roll sheet R in the transport direction, causes the thermal head 65 to print characters, images, and the like on the roll sheet R, causes the cutter unit 66 to cut the roll sheet R so as to issue sheet pieces.

Figure 3:
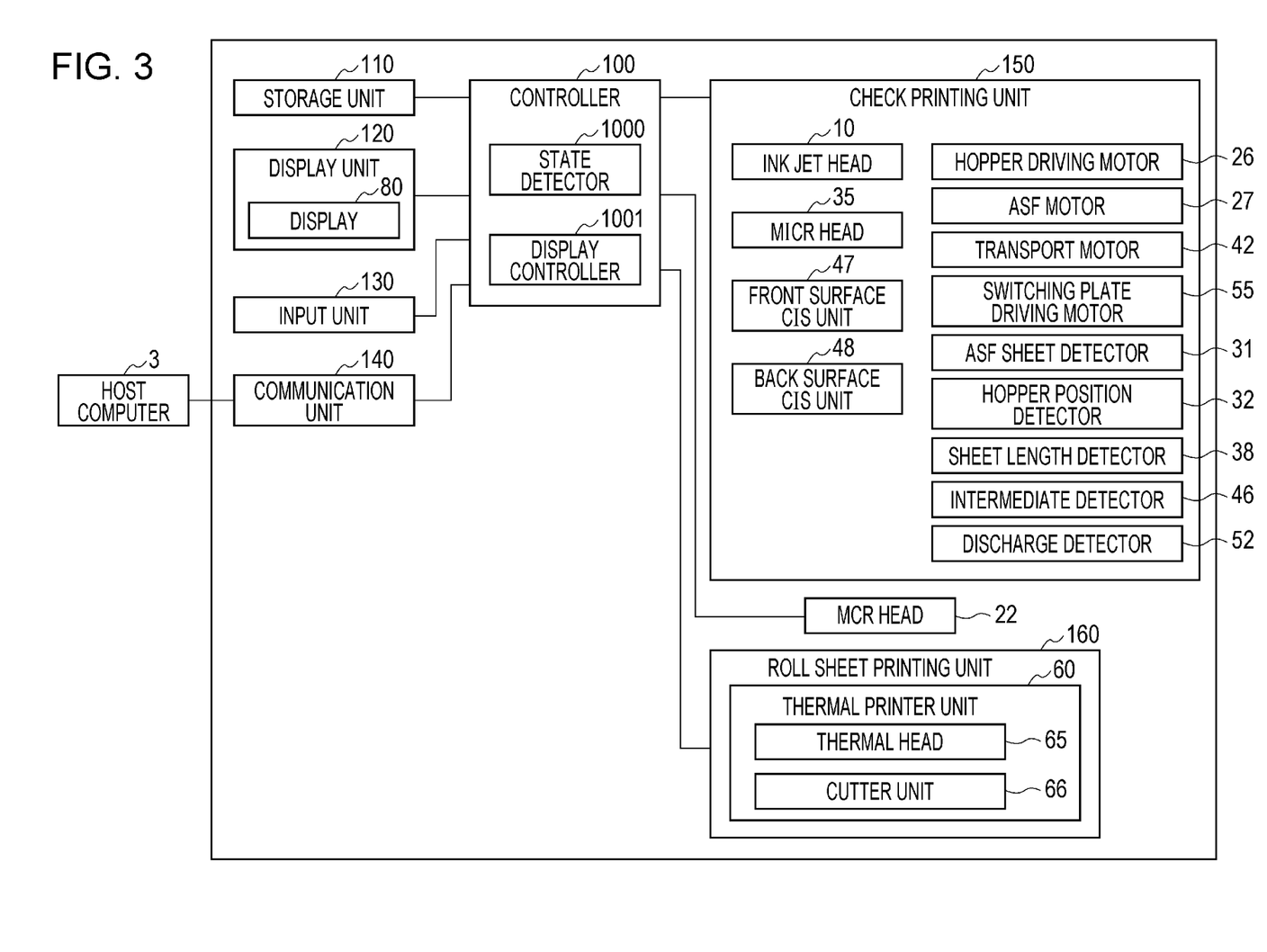
FIG. 3 is a diagram showing a functional configuration of the composite processing device.

FIG. 3 is a diagram showing a functional configuration of the composite processing device 1.

The composite processing device 1 includes a controller (processor) 100, a storage unit (memory) 110, a display unit (display) 120, an input unit (touch panel, keyboard, or mouse) 130, a communication unit (communication circuit, communication connector, communication board, or communication port) 140, a check printing unit (first printing mechanism or second printing mechanism) 150, and a roll sheet printing unit (first printing mechanism or second printing mechanism) 160.

The controller 100 includes a processor (not shown) such as a CPU, a ROM, a RAM, an ASIC, a signal processing circuit, and the like and controls the units of the composite processing device 1. The controller 100, for example, the processor such as the CPU executes a process by causing hardware and software to collaborate with each other. Specifically, the controller 100 or the processor reads a program such as firmware stored in the ROM and executes the process, or causes, for example, a function implemented in the ASIC to execute the process, or causes, for example, a signal processing circuit to execute signal processing and execute the process.

The controller 100 includes a state detector 1000 (detector) and a display controller 1001 (controller) as functional blocks. The functional blocks are functions that are indicated as blocks for descriptive purposes and are enabled by causing the CPU (processor) to execute arithmetic processing in accordance with a control program. The functional blocks do not indicate specific application software or hardware. The functional blocks are described later.

The storage unit 110 includes a nonvolatile memory such as a hard disk, an EEPROM, or a solid state drive (SSD) and stores various types of data so that the data is rewritable.

The display unit 120 includes a display 80. The display 80 according to the embodiment is a display device for displaying 4 monochrome gray levels and displaying various types of information in accordance with control by the controller 100. The display unit 120 also includes multiple LEDs and causes the LEDs to light up, turn off, and blink in predetermined manners in accordance with control by the controller 100.

The input unit 130 includes an input device such as the operation switches 131 included in the composite processing device 1. The input unit 130 detects a user operation performed using the input device and outputs information of the detected user operation to the controller 100. The controller 100 executes a process corresponding to an entry from the input unit 130.

The communication unit 140 communicates with a host computer 3 under control by the controller 100 in accordance with a predetermined communication standard. The host computer 3 is a device arranged outside the composite processing device 1. The host computer 3 is a control device for controlling the composite processing device 1. For example, the host computer 3 is a desktop, laptop, or tablet personal computer. The host computer 3 may be a dedicated computer for controlling the composite processing device 1.

The check printing unit 150 executes a check process. The check process includes processes to be executed for transport of a check 4 or includes printing by the ink jet head 10, reading by the MICR head 35, and reading by the front surface CIS unit 47 and the back surface CIS unit 48.

The check printing unit 150 includes the ink jet head 10, the hopper driving motor 26, the ASF motor 27, the transport motor 42, the switching plate driving motor 55, the MICR head 35, the front surface CIS unit 47, the back surface CIS unit 48, the ASF sheet detector 31, the hopper position detector 32, the sheet length detector 38, the intermediate detector 46, and the discharge detector 52.

The check printing unit 150 supplies a driving current to the ink jet head 10 in accordance with control by the controller 100 and executes printing on the check 4.

The check printing unit 150 outputs a driving current and a driving pulse to the hopper driving motor 26 in accordance with control by the controller 100 and causes the hopper driving motor 26 to rotationally move the hopper 25. In addition, the check printing unit 150 outputs a driving current and a driving pulse to the ASF motor 27 and the transport motor 42 in accordance with control by the controller 100 and causes the ASF motor 27 and the transport motor 42 to operate. The rollers connected to the motors 27 and 42 are driven in response to the operations of the ASF motor 27 and the transport motor 42. Furthermore, the check printing unit 150 outputs a driving current and a driving pulse to the switching plate driving motor 55 in accordance with control by the controller 100 and causes the switching plate driving motor 55 to move the switching plate 54 and switch a destination of a check 4 to the main pocket 19a or the sub-pocket 19b.

The check printing unit 150 causes the MICR head 35, the front surface CIS head 47, and the back surface CIS unit 48 to read corresponding information in accordance with control by the controller 100. The check printing unit 150 outputs read signals output by the MICR head 35, the front surface CIS head 47, and the back surface CIS unit 48 to the controller 100.

The check printing unit 150 supplies currents to the ASF sheet detector 31, the hopper position detector 32, the sheet length detector 38, the intermediate detector 46, and the discharge detector 52 in accordance with control by the controller 100 and acquires output values from the ASF sheet detector 31, the hopper position detector 32, the sheet length detector 38, the intermediate detector 46, and the discharge detector 52 at predetermined time intervals. The check printing unit 150 outputs the acquired output values to the controller 100.

The roll sheet printing unit 160 includes the thermal printing unit 60 and issues sheet pieces in accordance with control by the controller 100.

In the following description, when the check printing unit 150 and the roll sheet printing unit 160 are not distinguished from each other, the check printing unit 150 and the roll sheet printing unit 160 are collectively referred to as printing units.

Next, the functional blocks of the controller 100 are described. The controller 100 includes the state detector 1000 and the display controller 1001 as the functional blocks.

The state detector 1000 detects (determines) whether the check printing unit 150 and the roll sheet printing unit 160 are in a printing enabled state or a printing disabled state.

When the check printing unit 150 is in the printing enabled state, printing to be executed by the ink jet head 10 is enabled. When the check printing unit 150 is in the printing disabled state, the printing to be executed by the ink jet head 10 is disabled. For example, when the amount of the ink remaining in the ink cartridge 45 is equal to or smaller than a predetermined value or the amount of the ink is insufficient, the check printing unit 150 is in the printing disabled state. When the MICR head 35 is in a reading disabled state for a certain reason, the check printing unit 150 does not execute the check process, and the printing is not executed by the ink jet head 10. Thus, when the check printing unit 150 is in the printing disabled state, the printing disabled state of the check printing unit 150 may include a state in which the printing to be executed by the ink jet head 10 is disabled due to the disabling of the check process.

When the roll sheet printing unit 160 is in the printing enabled state, printing to be executed by the thermal head 65 is enabled. When the roll sheet printing unit 160 is in the printing disabled state, the printing to be executed by the thermal head 65 is disabled. For example, when the amount of the remaining roll sheet R is equal to or smaller than a predetermined value or the amount of the roll sheet R is insufficient, the roll sheet printing unit 160 is in the printing disabled state.

The state detector 1000 uses a predetermined method to acquire the amount of the remaining ink, the states of the heads, the states of the motors, and the states of the detectors and detects, based on the acquired results, whether the check printing unit 150 is in the printing enabled state or the printing disabled state. In addition, the state detector 1000 uses a predetermined method to acquire the amount of the remaining roll sheet R, the state of the thermal head 65, the state of the cutter unit 66, and the like and detects, based on the acquired results, whether the roll sheet printing unit 160 is in the printing enabled state or the printing disabled state.

The printing disabled state detected by the state detector 1000 includes a recovery enabled state and a recovery disabled state. The recovery enabled state is a printing disabled state in which the disabling of the printing can be easily resolved by a user operation. For example, the recovery enabled state is a state in which the composite processing device 1 is out of the ink or out of the roll sheet. The recovery disabled state is a highly probable printing disabled state in which the disabling of the printing cannot be easily resolved by a user operation and in which an expert for the composite processing device 1 needs to resolve the disabling of the printing. Examples of the recovery disabled state are operational errors of the heads, operational errors of the motors, and operational errors of the detectors.

The display controller 1001 causes the display 80 to display various types of information such as the state of the composite processing device 1. Operations of the composite processing device 1 are described below, while display control by the display controller 1001 is mainly explained below.

Figure 4A:
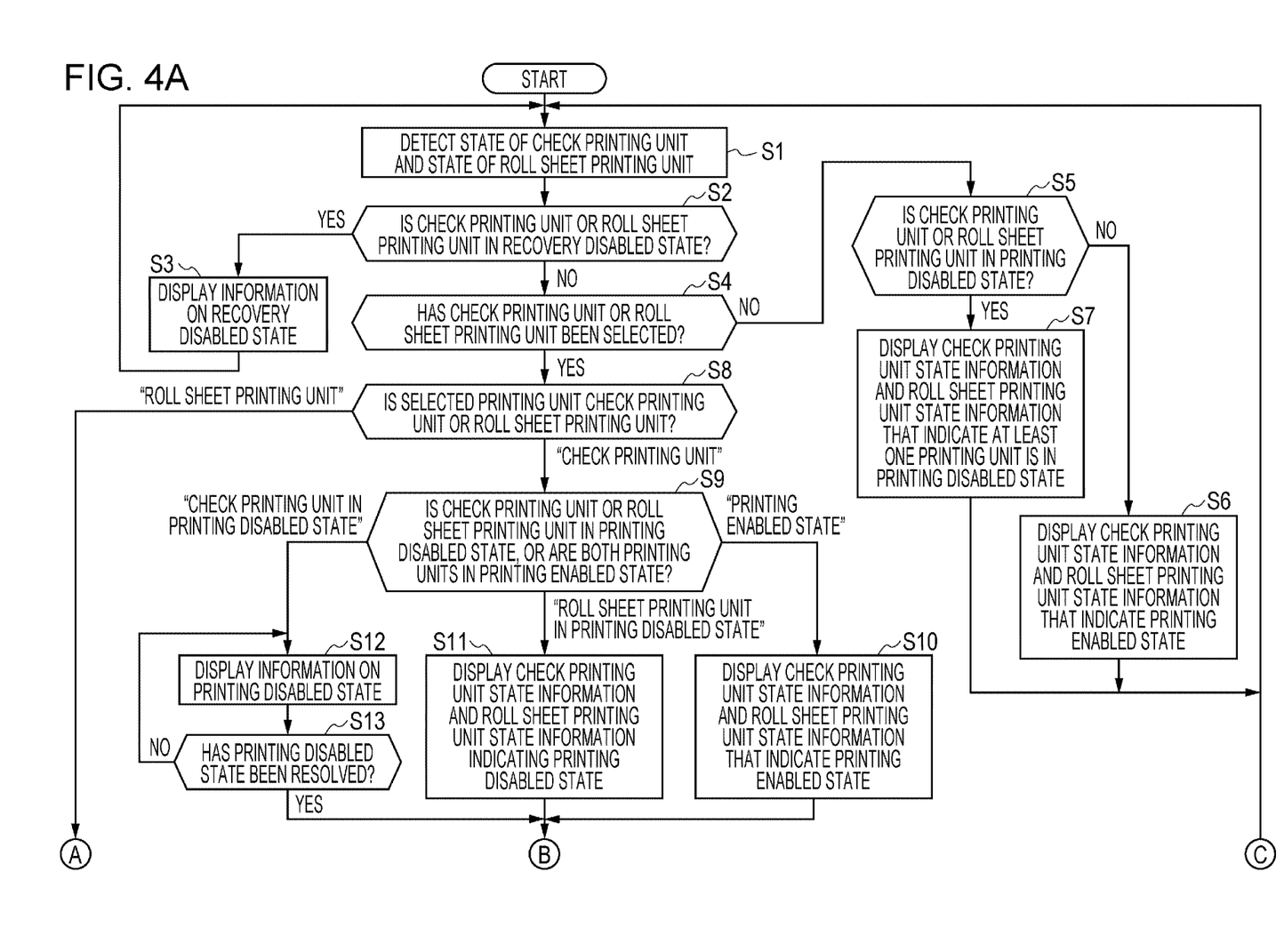
FIGS. 4A and 4B are a flowchart showing operations of the composite processing device.
Figure 4B:
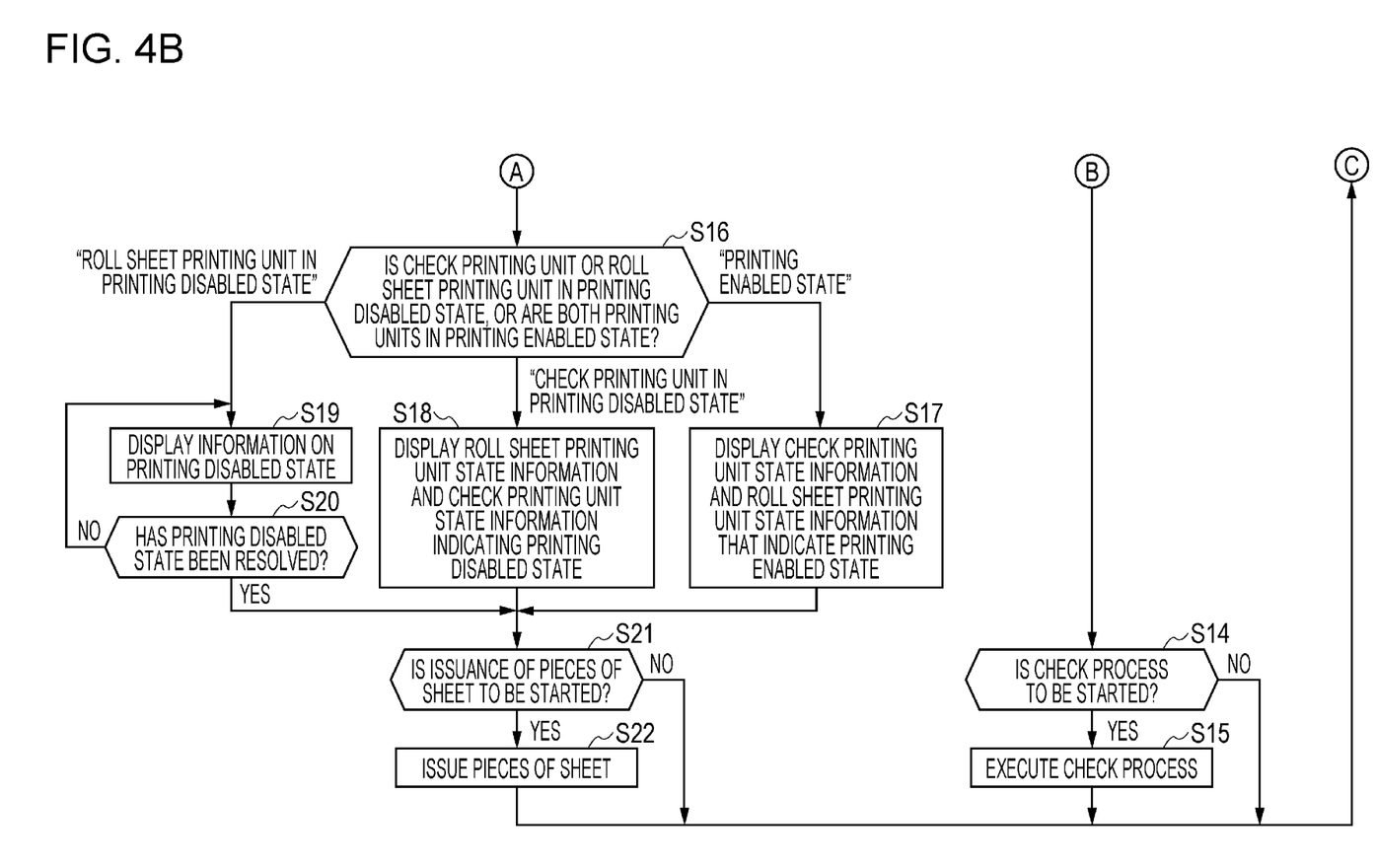

FIGS. 4A and 4B are a flowchart showing operations of the composite processing device 1.

It is assumed that, at start time of the flowchart shown in FIGS. 4A and 4B, the composite processing device 1 is in a standby state in which the composite processing device 1 is waiting for the execution of printing by the check printing unit 150 or the roll sheet printing unit 160.

The state detector 1000 detects whether the check printing unit 150 and the roll sheet printing unit 160 are in the printing enabled state or the printing disabled state (in step S1).

When the check printing unit 150 or the roll sheet printing unit 160 is in the printing disabled state, the state detector 1000 determines whether or not the check printing unit 150 or the roll sheet printing unit 160 is in the recovery disabled state (in step S2).

When the check printing unit 150 or the roll sheet printing unit 160 is in the recovery disabled state (YES in step S2), the display controller 1001 executes a process of step S3. The process of step S3 is described later.

When the check printing unit 150 and the roll sheet printing unit 160 are not in the recovery disabled state (NO in step S2) or when the check printing unit 150 and the roll sheet printing unit 160 are in the printing enabled state or the recovery enabled state, the controller 100 executes a process of step S4.

The controller 100 determines whether or not any of the check printing unit 150 and the roll sheet printing unit 160 is already selected (in step S4).

The check printing unit 150 or the roll sheet printing unit 160 is selected at predetermined time based on a command transmitted from the host computer 3, for example. For example, the host computer 3 transmits, to the composite processing device 1, a command to instruct the composite processing device 1 to determine and select a printing unit, based on a process to be executed. The controller 100 of the composite processing device 1 selects, based on the received command, the single printing unit for executing printing from among the multiple printing units. The command to instruct the composite processing device 1 to select the printing unit may specify the check printing unit 150 or the roll sheet printing unit 160 or specify a check or a roll sheet as a printing medium. For example, when the check is specified as the printing medium in the command, the controller 100 selects the check printing unit 150. When the roll sheet is specified as the printing medium in the command, the controller 100 selects the roll sheet printing unit 160.

When the check printing unit 150 and the roll sheet printing unit 160 are not selected as printing units for executing printing (NO in step S4), the display controller 1001 causes the display 80 to display state information of the composite processing device 1 based on the results of the detection by the state detector 1000 in step S1.

When the check printing unit 150 and the roll sheet printing unit 160 are in the printing enabled state (NO in step S5), the display controller 1001 causes the display 80 to display check printing unit state information (first printing mechanism state information or second printing mechanism state information) KJJ indicating the printing enabled state and roll sheet printing unit state information (first printing mechanism state information or second printing mechanism state information) RJJ indicating the printing enabled state (in step S6).

Figure 5:
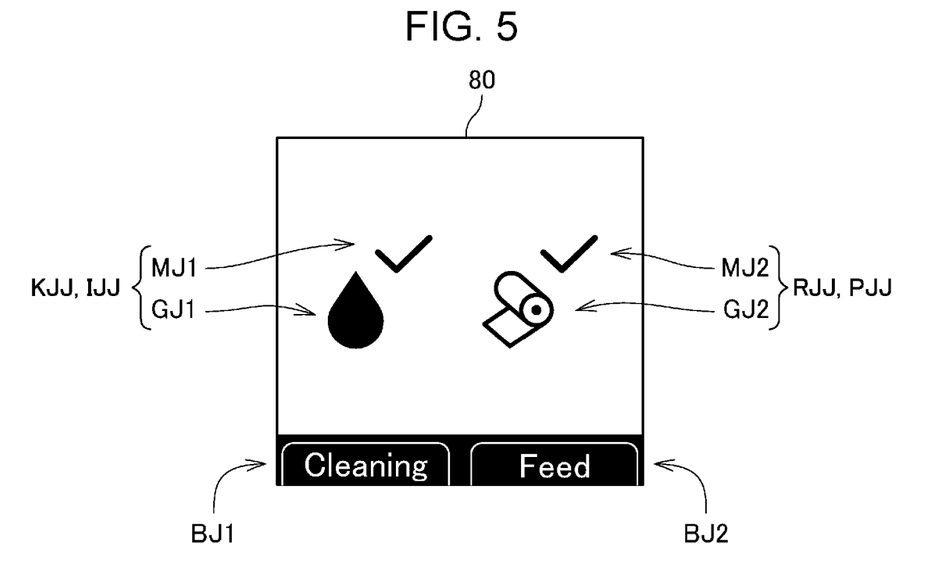
FIG. 5 is a diagram showing an example of check printing unit state information and roll sheet printing unit state information.

FIG. 5 is a diagram showing an example of the check printing unit state information KJJ and the roll sheet printing unit state information RJJ.

The check printing unit state information KJJ is, for example, ink state information (first consumable state information or second consumable state information) IJJ indicating the state of the ink to be consumed for printing by the check printing unit 150. The ink state information IJJ includes image information GJ1 indicating a diagram of the ink and explicit information MJ1 clarifying the state of the check printing unit 150.

The roll sheet printing unit state information RJJ is roll sheet state information (first consumable state information or second consumable state information) PJJ indicating the state of the roll sheet R to be consumed for printing by the roll sheet printing unit 160, for example. The roll sheet state information PJJ includes image information GJ2 indicating a diagram of the roll sheet R and explicit information MJ2 clarifying the state of the roll sheet printing unit 160.

The explicit information MJ1 and MJ2 shown in FIG. 5 is information indicated by check marks and indicates that the check printing unit 150 and the roll sheet printing unit 160 are in the printing enabled state.

When the check printing unit state information KJJ and the roll sheet printing unit state information RJJ are simultaneously displayed, the user can recognize the states of the printing units.

As shown in FIG. 5, the display controller 1001 causes the display 80 to display not only the check printing unit state information KJJ (ink state information IJJ) and the roll sheet printing unit state information RJJ (roll sheet state information PJJ) but also button information BJ1 and BJ2 indicating buttons selectable by the operation switches 131 arranged under and near the display 80. The button information BJ1 is information indicating an instruction to execute cleaning of the ink jet head 10 and is displayed at a position corresponding to the ink state information IJJ in a display region of the display 80. The button information BJ2 is information indicating an instruction to feed the roll sheet R and is displayed at a position corresponding to the roll sheet state information PJJ in the display region of the display 80. The button information BJ1 and BJ2 indicates functions of the operation switches 131.

When the check printing unit 150 is selected as a printing unit for executing printing, the display controller 1001 may cause the display 80 to display only the button information BJ1. When the roll sheet printing unit 160 is selected as a printing unit for executing printing, the display controller 1001 may cause the display 80 to display only the button information BJ2. When both of the printing units are not selected, the display controller 1001 may cause the display 80 to display the button information BJ1 and the button information BJ2. In this case, regarding the state of the composite processing device 1, the user can easily recognize a selected printing unit or whether both of the printing units are not selected.

Whether or not the button information BJ1 and BJ2 is displayed may be selected based on the states of the corresponding consumables. For example, when the amount of the remaining ink is equal to or smaller than a predetermined value, the button information BJ1 may not be displayed or may be displayed in gray. When the amount of the remaining roll sheet is equal to or smaller than a predetermined value, the button information BJ2 may not be displayed or may be displayed in gray. When the amount of the remaining ink is small, the ink jet head 10 is not cleaned in some cases. When the amount of the remaining roll sheet R is small, the roll sheet is not fed in some cases. Thus, it is preferable that the button information BJ1 and BJ2 be not displayed or be displayed in gray when the amount of the remaining ink and the amount of the remaining roll sheet R are small.

Return to the description of the flowchart shown in FIGS. 4A and 4B. When the check printing unit 150 or the roll sheet printing unit 160 is in the printing disabled state (YES in step S5), the display controller 1001 causes the display 80 to display the check printing unit state information KJJ and the roll sheet printing unit state information RJJ (in step S7).

Figure 6:
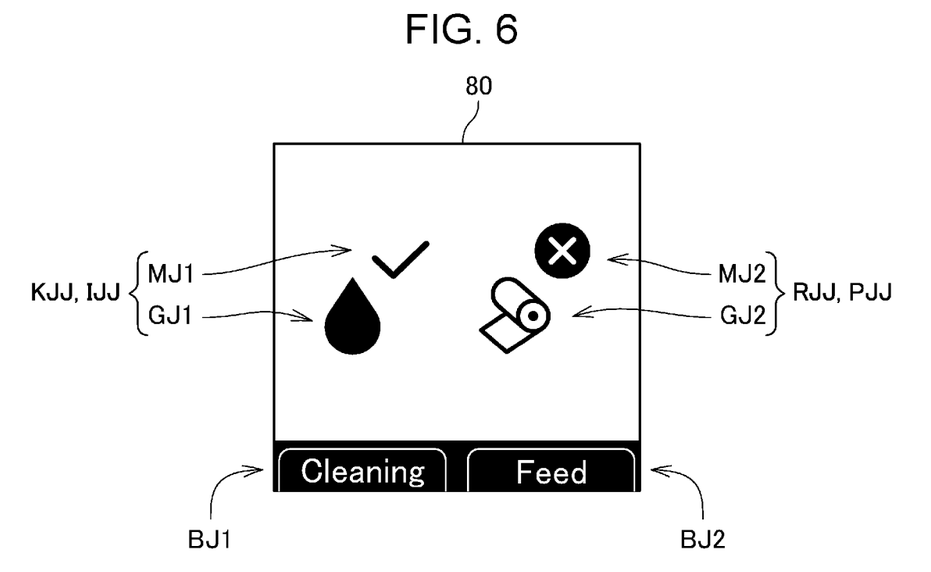
FIG. 6 is a diagram showing an example of the check printing unit state information and the roll sheet printing unit state information.

FIG. 6 is a diagram showing an example of the check printing unit state information KJJ and the roll sheet printing unit state information RJJ.

FIG. 6 exemplifies the case where the roll sheet printing unit 160 is in the printing disabled state.

As is apparent from the comparison of FIGS. 6 and 5, the roll sheet printing unit state information RJJ shown in FIG. 6 includes the explicit information MJ2 indicating a symbol "x". The explicit information MJ2 indicating the symbol "x" indicates that the roll sheet printing unit 160 is in the printing disabled state.

Similarly, when the check printing unit 150 is in the printing disabled state, the explicit information MJ1 of the check printing state information KJJ indicates a symbol "x". When the check printing unit 150 and the roll sheet printing unit 160 are in the printing disabled state, the explicit information MJ1 of the check printing unit state information KJJ and the explicit information MJ2 of the roll sheet printing unit state information RJJ indicate the symbols "x".

In this manner, the display controller 1001 causes the display 80 to simultaneously display information indicating that a printing unit in the printing disabled state is in the printing disabled state and state information of the other printing unit. Thus, the user can recognize a printing unit in the printing disabled state.

Return to the description of the flowchart shown in FIGS. 4A and 4B. The display controller 1001 changes information to be displayed by the display 80, based on the results of detecting the states of the printing units by the state detector 1000 in step S1 and the result of determining the printing unit by the controller 100 in step S4 in the following manner.

When the check printing unit 150 is selected ("check printing unit" in step S8) and the printing units 150 and 160 are in the printing enabled state ("printing enabled state" in step S9), the display controller 1001 causes the display 80 to display the check printing unit state information KJJ indicating the printing enabled state and the roll sheet printing unit state information RJJ indicating the printing enabled state (in step S10). In addition, the display controller 1001 causes the display 80 to display only the button information BJ1 among the button information BJ1 and BJ2. Thus, the user can recognize that the printing units are in the printing enabled state and that the check printing unit 150 is already selected.

Next, the controller 100 determines whether or not the check process is to be started (in step S14). For example, the controller 100 receives a control command to instruct the composite processing device 1 to execute the check process from the host computer 3. When a check 4 is stored in the stocker 15 and the ASF sheet detector 31 detects the check 4, the controller 100 determines that the check process is to be started. When the controller 100 determines that the check process is to be started (YES in step S14), the controller 100 controls the check printing unit 150 and causes the check printing unit 150 to execute the check process (in step S15). When the controller 100 determines that the check process is not executed (NO in step S14), the controller 100 causes a process shown in FIGS. 4A and 4B to return to step S1.

Return to the description of step S9. When the check printing unit 150 is selected ("check printing unit" in step S8) and the roll sheet printing unit 160 is in the printing disabled state ("roll sheet printing unit in printing disabled state" in step S9), the display controller 1001 causes the display 80 to display the check printing unit state information KJJ indicating the printing enabled state and the roll sheet printing unit state information RJJ indicating the printing disabled state (in step S11). For example, the display controller 1001 causes the display 80 to display the check printing unit state information KJJ including the explicit information MJ1 indicating a check mark and the roll sheet printing unit state information RJJ including the explicit information MJ2 indicating the symbol "x". In addition, the display controller 1001 causes the display 80 to display the button information BJ1. Specifically, the display controller 1001 causes the display 80 to display information included in the information shown in FIG. 6 and excluding the button information BJ2.

Thus, the user can recognize that the roll sheet printing unit 160 is in the printing disabled state and that the check printing unit 150 is already selected.

When the check printing unit 150 is selected ("check printing unit" in step S8) and the check printing unit 150 is in the printing disabled state ("check printing unit in printing disabled state" in step S9), the display controller 1001 causes the display 80 to display information on the printing disabled state of the check printing unit 150 (in step S12). The information on the printing disabled state is, for example, resolution information KSJ.

Figure 7A:
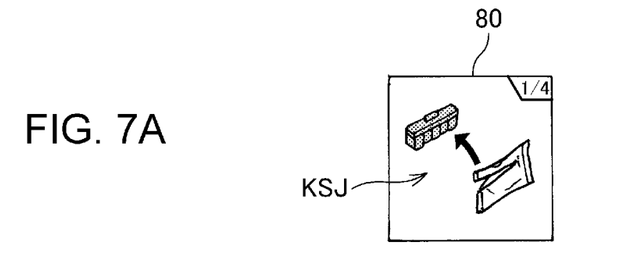
FIG. 7A is a diagram showing an example of resolution information.
Figure 7B:
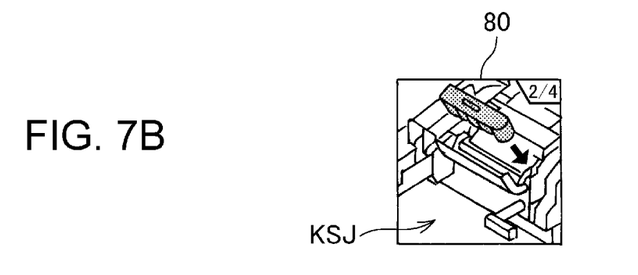
FIG. 7B is a diagram showing an example of the resolution information.
Figure 7C:
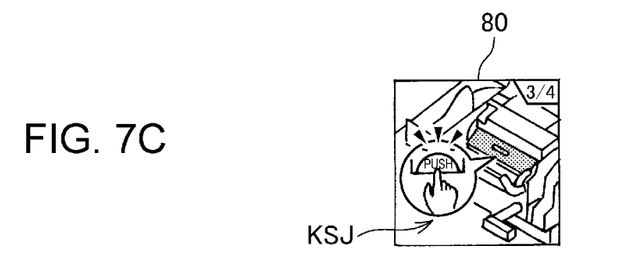
FIG. 7C is a diagram showing an example of the resolution information.
Figure 7D:
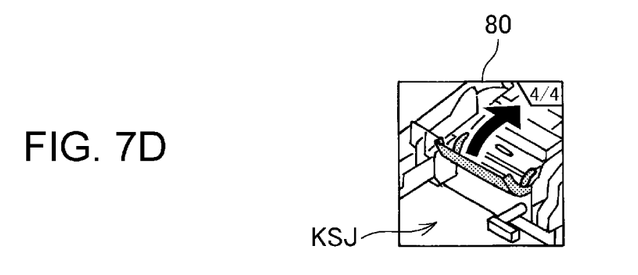
FIG. 7D is a diagram showing an example of the resolution information.

FIGS. 7A, 7B, 7C, and 7D are diagrams showing examples of the resolution information KSJ as the information on the printing disabled state. FIGS. 7A to 7D sequentially show an operation procedure for resolving deficiency in the ink when the check printing unit 150 is in the printing disabled state due to the deficiency in the ink. Specifically, the following series of operations of installing (or replacing) an ink cartridge 45 are displayed by the display 80. That is, a new ink cartridge 45 is prepared (FIG. 7A), a cover of an ink cartridge storage unit of the body 13 of the composite processing device 1 is opened and the ink cartridge 45 is inserted (FIG. 7B), a central portion of an upper surface of the ink cartridge 45 is pressed so that the ink cartridge 45 is installed at a predetermined position (FIG. 7C), and the cover of the ink cartridge storage unit is closed (FIG. 7D).

The resolution information KSJ shown in FIGS. 7A to 7D is image information of diagrams indicating the operations of resolving the deficiency in the ink. When the display 80 displays the image information of the diagrams indicating the operations of resolving the printing disabled state as the resolution information KSJ, the user can recognize the operations of resolving the printing disabled state.

In the case where multiple types of resolution information KSJ to be displayed to resolve the printing disabled state as shown in FIGS. 7A to 7D in step S12 exist, every time a predetermined time period elapses, the display controller 1001 may switch the information to be displayed in accordance with the operation procedure. In this case, the information may be displayed in order from the information shown in FIG. 7A after the display of the information shown in FIG. 7D so that the information shown in FIGS. 7A to 7D is repeatedly displayed. When the display controller 1001 detects that an operation indicated in the resolution information KSJ displayed by the display 80 is performed, the display controller 1001 may switch the displayed resolution information KSJ to the resolution information KSJ indicating an operation to be executed next. For example, when the operation shown in FIG. 7B is performed, the display controller 1001 may cause the display 80 to display the resolution information KSJ shown in FIG. 7C and indicating the operation to be requested next.

As described above, when the selected check printing unit 150 is in the printing disabled state, the display controller 1001 causes the display 80 to display the information on the printing disabled state of the check printing unit 150. In the embodiment, the information on the printing disabled state is the resolution information KSJ indicating the operation procedure for resolving the printing disabled state. Thus, the composite processing device 1 can support the user so that the user can quickly support the printing disabled state of the check printing unit 150.

When the check printing unit 150 is selected and is in the printing enabled state, the display controller 1001 causes the display 80 to display the check printing unit state information KJJ and the roll sheet printing unit state information RJJ. When the check printing unit 150 is selected and is in the printing disabled state, the display controller 1001 causes the display 80 to display information (resolution information KSJ) on the printing disabled state of the check printing unit 150.

Thus, since the display controller 1001 enables information (including the check printing unit state information KJJ, the roll sheet printing unit state information RJJ, and the resolution information KSJ), which is to be displayed by the display 80 and indicates the printing units, to vary based on the state of the selected check printing unit 150, the display controller 1001 enables the display 80 to appropriately display information on the check printing unit 150 and the roll sheet printing unit 160 in the composite processing device 1 including the check printing unit 150 and the roll sheet printing unit 160.

In this case, the check printing unit 150 corresponds to the first printing mechanism, the roll sheet printing unit 160 corresponds to the second printing mechanism, the check printing unit state information KJJ corresponds to the first printing mechanism state information, and the roll sheet printing unit state information RJJ corresponds to the second printing mechanism state information. In addition, the ink corresponds to a first consumable, the ink state information IJJ corresponds to first consumable state information, the roll sheet corresponds to a second consumable, and the roll sheet state information PJJ corresponds to second consumable state information.

Return to the description of the flowchart shown in FIGS. 4A and 4B. The controller 100 determines, based on the results of the detection by the state detector 1000, whether or not the printing disabled state of the check printing unit 150 has been resolved (in step S13). When the controller 100 determines that the printing disabled state of the check printing unit 150 has not been resolved (NO in step S13), the controller 100 causes the process to return to step S12.

On the other hand, when the controller 100 determines that the printing disabled state of the check printing unit 150 has been resolved (YES in step S13), the controller 100 causes the process to proceed to step S14. In addition, the display controller 1001 switches the check printing unit state information KJJ from the information indicating the printing disabled state to information indicating the printing enabled state and causes the display 80 to display the check printing unit state information KJJ indicating the printing enabled state.

Return to the description of step S8. When the roll sheet printing unit 160 is selected ("roll sheet printing unit" in step S8) and the printing units are in the printing enabled state ("printing enabled state" in step S16), the display controller 1001 causes the display 80 to display the check printing unit state information KJJ indicating the printing enabled state and the roll sheet printing unit state information RJJ indicating the printing enabled state (in step S17). In addition, the display controller 1001 causes the display 80 to display only the button information BJ2 among the button information BJ1 and BJ2. Thus, the user can recognize that the printing units are in the printing enabled state and that the roll sheet printing unit 160 is already selected.

Next, the controller 100 determines whether or not the issuance of sheet pieces on which characters, images, and the like have been printed is to be started (in step S21). For example, when the controller 100 receives, from the host computer 3, a control command to instruct the composite processing device 1 to issue sheet pieces or printing data to be printed on the roll sheet R, the controller 100 determines that the issuance of the sheet pieces is to be started. When the controller 100 determines that the issuance of the sheet pieces is to be started (YES in step S21), the controller 100 prints characters, images, and the like on the roll sheet R, cuts printed portions of the roll sheet R, and issues pieces of the roll sheet R (in step S22). When the issuance of the sheet pieces is not executed (NO in step S21), the controller 100 causes the process to return to step S1.

Return to the description of step S16. When the roll sheet printing unit 160 is selected ("roll sheet printing unit" in step S8) and the check printing unit 150 is in the printing disabled state ("check printing unit in printing disabled state" in step S16), the display controller 1001 causes the display 80 to display the check printing unit state information KJJ indicating the printing disabled state and the roll sheet printing unit state information RJJ indicating the printing enabled state (in step S18). For example, the display controller 1001 causes the display 80 to display the check printing unit state information KJJ including the explicit information MJ1 indicating the symbol "x" and the roll sheet printing unit state information RJJ including the explicit information MJ2 indicating a check mark. In addition, the display controller 1001 causes the display 80 to display the button information BJ2.

Thus, the user can recognize that the check printing unit 150 is in the printing disabled state and that the roll sheet printing unit 160 is already selected.

Return to the description of step S16. When the roll sheet printing unit 160 is selected ("roll sheet printing unit" in step S8) and the roll sheet printing unit 160 is in the printing disabled state ("roll sheet printing unit in printing disabled state" in step S16), the display controller 1001 causes the display 80 to display information on the printing disabled state of the roll sheet printing unit 160 (in step S19). As described above, in the embodiment, the information on the printing disabled state is the resolution information KSJ indicating the operation procedure for resolving the printing disabled state.

Figure 8:
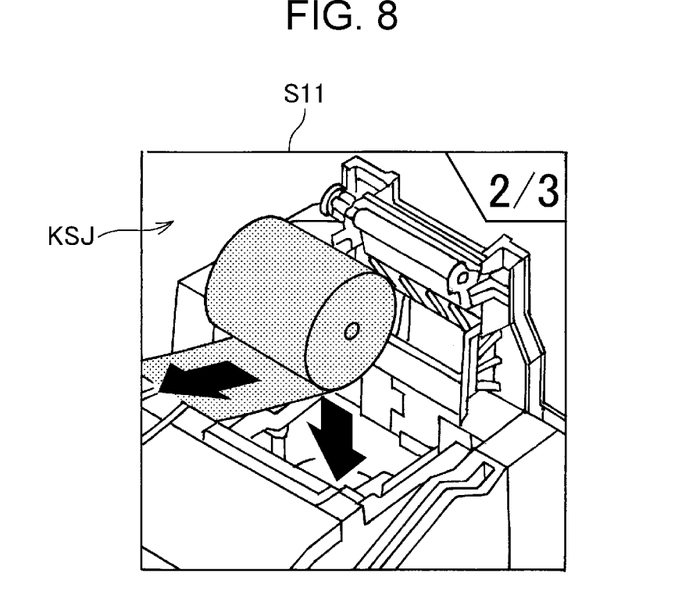
FIG. 8 is a diagram showing an example of the resolution information.

FIG. 8 is a diagram showing an example of the resolution information KSJ as the information on the printing disabled state.

FIG. 8 shows a part of the operation procedure for resolving a state in which the roll sheet is deficient when the roll sheet printing unit 160 is in the printing disabled state due to the deficiency in the roll sheet. FIG. 8 shows displayed information on the installation of the roll sheet R that is the second operation among a series of operations, which are the opening of the printer cover 61 (operation procedure 1), the installation of the roll sheet R in the roll sheet storage region 62 in a state in which an edge portion of the roll sheet R is extracted from a rolled portion of the roll sheet R (operation procedure 2), and the closing of the printer cover 61 (operation procedure 3).

The resolution information KSJ shown in FIG. 8 is image information of a diagram indicating an operation of resolving deficiency in the roll sheet. Thus, the user can recognize the operation of resolving the printing disabled state. In addition, the composite processing device 1 can support the user so that the user can quickly resolve the printing disabled state of the roll sheet printing unit 160.

In the case where multiple types of resolution information KSJ to be displayed by the display 80 exist in step S19, every time a predetermined time period elapses, the display controller 1001 may switch the displayed information in the same manner as step S12. When the display controller 1001 detects that an operation indicated by the resolution information KSJ displayed by the display 80 is performed, the display controller 1001 may switch the displayed resolution information KSJ to the resolution information KSJ indicating an operation to be performed next.

Return to the description of the flowchart shown in FIGS. 4A and 4B. The controller 100 determines whether or not the printing disabled state of the roll sheet printing unit 160 has been resolved (in step S20). When the controller 100 determines that the printing disabled state of the roll sheet printing unit 160 has not been resolved (NO in step S20), the controller 100 causes the process to return to step S19.

On the other hand, when the controller 100 determines that the printing disabled state of the roll sheet printing unit 160 has been resolved (YES in step S20), the controller 100 causes the process to proceed to step S21. In addition, the display controller 1001 switches the roll sheet printing unit state information RJJ from the information indicating the printing disabled state to information indicating the printing enabled state and causes the display 80 to display the roll sheet printing unit state information RJJ indicating the printing enabled state.

As described above, when the roll sheet printing unit 160 is selected and is in the printing enabled state, the display controller 1001 causes the display 80 to display the check printing unit state information KJJ and the roll sheet printing unit state information RJJ. When the roll sheet printing unit 160 is selected and is in the printing disabled state, the display controller 1001 causes the display 80 to display information (resolution information KSJ) on the printing disabled state of the roll sheet printing unit 160.

Thus, since the display controller 1001 enables the information (including the check printing unit state information KJJ, the roll sheet printing unit state information RJJ, and the resolution information KSJ), which is to be displayed by the display 80 and indicates the printing units, to vary based on the state of the selected roll sheet printing unit 160, the display controller 1001 enables the display 80 to appropriately display the information on the check printing unit 150 and the roll sheet printing unit 160.

In this case, the roll sheet printing unit 160 corresponds to the first printing mechanism, the check printing unit 150 corresponds to the second printing mechanism, the roll sheet printing unit state information RJJ corresponds to the first printing mechanism state information, and the check printing unit state information KJJ corresponds to the second printing mechanism state information. In addition, the roll sheet R corresponds to the first consumable, the roll sheet state information PJJ corresponds to the first consumable state information, the ink corresponds to the second consumable, and the ink state information IJJ corresponds to the second consumable state information.

Return to the description of step S2 of the flowchart shown in FIGS. 4A and 4B. When at least one of the check printing unit 150 and the roll sheet printing unit 160 is in the recovery disabled state (YES in step S2), the display controller 1001 causes the display 80 to display information on the recovery disabled state (in step S3).

Figure 9:
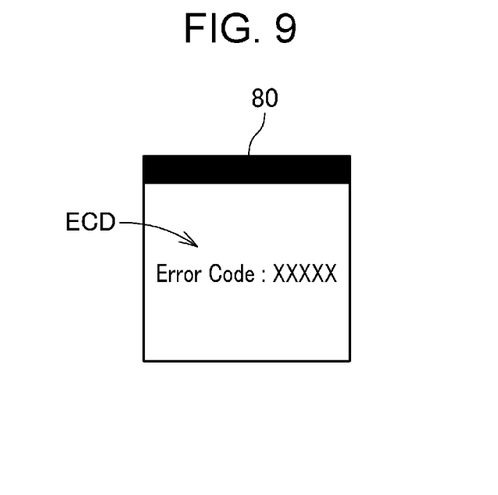
FIG. 9 is a diagram showing an example of information on recovery disabled information.

FIG. 9 is a diagram showing an example of the information on the recovery disabled state.

The display controller 1001 causes the display 80 to display an error code ECD identifying an error causing the recovery disabled state as the information on the recovery disabled state. Thus, the user can reference a manual of the composite processing device 1 or the like based on the error code ECD displayed by the display 80 and recognize the type of the error causing the recovery disabled state.

Especially, when the check printing unit 150 or the roll sheet printing unit 160 is in the recovery disabled state, the display controller 1001 causes the display 80 to display information on the recovery disabled state, regardless of whether the check printing unit 150 or the roll sheet printing unit 160 is selected. Specifically, the composite processing device 1 causes the display 80 to display error information based on the type of an error that has occurred, regardless of selection states of the printing units. Thus, even when an unselected printing unit is in the recovery disabled state, the display controller 1001 enables the user to reliably recognize information on the recovery disabled state.

As described above, the composite processing device 1 includes the check printing unit 150 and the roll sheet printing unit 160 and causes selected one of the check printing unit 150 and the roll sheet printing unit 160 to execute printing. The composite processing device 1 includes the state detector 1000 configured to detect whether the check printing unit 150 and the roll sheet printing unit 160 are in the printing enabled state or the printing disabled state, the display 80 configured to display information, and the display controller 1001 configured to cause the display 80 to display the check printing unit state information KJJ and the roll sheet printing unit state information RJJ based on the results of the detection by the state detector 1000.

When the check printing unit 150 (first printing mechanism) is selected and is in the printing enabled state, the display controller 1001 causes the display 80 to display the check printing unit state information KJJ (first printing mechanism state information) and the roll sheet printing unit state information RJJ (second printing mechanism state information). When the check printing unit 150 is selected and is in the printing disabled state, the display controller 1001 causes the display 80 to display information on the printing disabled state of the check printing unit 150.

When the roll sheet printing unit 160 (first printing mechanism) is selected and is in the printing enabled state, the display controller 1001 causes the display 80 to display the roll sheet printing unit state information RJJ (first printing mechanism state information) and the check printing unit state information KJJ (second printing mechanism state information). When the roll sheet printing unit 160 is selected and is in the printing disabled state, the display controller 1001 causes the display 80 to display information on the printing disabled state of the roll sheet printing unit 160.

According to this configuration, the composite processing device 1 including the check printing unit 150 and the roll sheet printing unit 160 enables information, which is to be displayed by the display 80 and indicates the printing units, to vary and enables the display 80 to appropriately display information on the printing units.

The printing disabled state includes the recovery enabled state and the recovery disabled state. When the check printing unit 150 or the roll sheet printing unit 160 is in the recovery disabled state, the display controller 1001 causes the display 80 to display information on the recovery disabled state of the check printing unit 150 or the roll sheet printing unit 160, regardless of whether the check printing unit 150 or the roll sheet printing unit 160 is selected.

According to this configuration, since the information on the recovery disabled state is displayed by the display 80 regardless of whether the check printing unit 150 or the roll sheet printing unit 160 is selected, the display controller 1001 enables the user to reliably recognize the information on the recovery disabled state.

The information on the recovery disabled state is information on the resolution of the printing disabled state.

According to this configuration, when the check printing unit 150 is in the printing disabled state, the display controller 1001 causes the display 80 to display the information (resolution information KSJ shown in FIGS. 7A to 7D) on the resolution of the printing disabled state of the check printing unit 150. When the roll sheet printing unit 160 is in the printing disabled state, the display controller 1001 causes the display 80 to display the information (resolution information KSJ shown in FIG. 8) on the resolution of the printing disabled state of the roll sheet printing unit 160. Thus, the composite processing device 1 can support the user so that the user can quickly resolve the printing disabled state of the printing units.

The check printing unit state information KJJ is the ink state information IJJ indicating the state of the ink to be consumed for printing by the check printing unit 150. When the check printing unit 150 corresponds to the first printing mechanism, the ink corresponds to the first consumable, and the ink state information IJJ corresponds to the first consumable state information. When the check printing unit 150 corresponds to the second printing mechanism, the ink corresponds to the second consumable, and the ink state information IJJ corresponds to the second consumable state information.

The roll sheet printing unit state information RJJ is the roll sheet state information PJJ indicating the state of the roll sheet R to be consumed for printing by the roll sheet printing unit 160. When the roll sheet printing unit 160 corresponds to the first printing mechanism, the roll sheet R corresponds to the first consumable, and the roll sheet state information PJJ corresponds to the first consumable state information. When the roll sheet printing unit 160 corresponds to the second printing mechanism, the roll sheet R corresponds to the second consumable, and the roll sheet state information PJJ corresponds to the second consumable state information.

According to this configuration, the user can recognize the states of the consumables.

When a selected printing unit is in the printing enabled state, the composite processing device 1 causes the display 80 to simultaneously display the states of the printing units, except that the other printing unit is in a second error state or the printing disabled state in which the other printing unit is in the recovery disabled state.

When the selected printing unit is in a first error state or the printing disabled state in which the selected printing unit is in the recovery enabled state, the composite processing device 1 causes the display 80 to display information on the resolution of the first error state. Even when an unselected printing unit is in the first error state, the composite processing device 1 does not cause the display 80 to display information on the resolution of the first error state. Since a selected printing unit can operate regardless of whether or not the first error state of an unselected printing unit has been resolved, the composite processing device 1 does not cause the display 80 to display information on the resolution of the first error state of the unselected printing unit. When a printing unit in the first error state is selected, the composite processing device 1 causes the display 80 to display information on the resolution of the first error state.

When a printing unit is in the second error state, the composite processing device 1 causes the display 80 to display error information indicating that the printing unit is in the second error state, regardless of a selection state of the printing unit.

The embodiment is an example of the invention and may be arbitrarily modified and applied within the scope of the invention.

For example, the embodiment exemplifies the check printing unit 150 and the roll sheet printing unit 160 as the printing units included in the composite processing device 1. It is, however, sufficient if the composite processing device 1 includes multiple printing units. The number of printing units included in the composite processing device 1, printing schemes of the printing units, and the types of the printing media are not limited.

The embodiment assumes that any of the check printing unit 150 and the roll sheet printing unit 160 is not selected (NO in step S4). When the composite processing device 1 does not receive a command to instruct the composite processing device 1 to select a printing unit from the host computer 3, a predetermined printing unit among the printing units may be selected. For example, a state in which the check printing unit 150 is selected may be indicated by an initial value. In this case, the aforementioned processes of steps S5 to S7 are not required.

For example, in the case where a method (method for controlling a printer) for controlling the composite processing device 1 is executed using a computer included in the composite processing device 1 or using an external device connected to the composite processing device 1, the invention can be applied using a program to be executed by the computer for executing the method, a storage medium from which the program is readable by the computer, or a transmission medium for transmitting the program.

The functions of the controller 100 may be enabled by multiple processors or a semiconductor chip. For example, the controller 100 may further include a sub-processing device (co-processor) such as a System-on-a-Chip (SoC), a micro control unit (MCU), or a field-programmable gate array (FPGA). The controller 100 may execute various types of control by causing the CPU and the sub-processing device to collaborate with each other or by selectively using any of the CPU and the sub-processing device.

For example, the process described with reference to FIGS. 4A and 4B is divided into the steps of the process based on main details of the process in order to easily understand the process to be executed by the composite processing device 1. The invention is not limited by the method for dividing the process into the steps and the names of the steps. The process may be divided into a larger number of steps of the process based on details of the process. The process may be divided so that at least one of the steps of the process includes two or more steps. Furthermore, the order in which the steps are executed may be changed without departing from the gist of the invention.

The functional units shown in FIG. 3 indicate the functional configuration, and a specific implementation scheme is not limited. Specifically, hardware corresponding to the functional units may not be implemented, and a single processor may execute a program to enable the functions of the multiple functional units. In the embodiment, at least one of the functions to be enabled by the software may be enabled by hardware, or at least one of the functions to be enabled by the hardware may be enabled by software. Specific detailed configurations of the other units of the composite processing device 1 may be arbitrarily changed without departing from the gist of the invention.

What is claimed is:

1. A printer including a first printing mechanism capable printing on a first media and a second printing mechanism capable printing on a second media different from the first media and configured to execute printing using selected one of the first and second printing mechanisms, comprising:
    a display configured to display information; and
    a processor configured to determine whether the first printing mechanism and the second printing mechanism are in a printing enabled state or a printing disabled state and to cause the display to display first printing mechanism state information indicating the state of the first printing mechanism and second printing mechanism state information indicating the state of the second printing mechanism based on results of the determination,
    wherein in response to selecting, by a command from a computer, the first printing mechanism which is in the printing enabled state, the processor is configured to cause the display to display simultaneously the first printing mechanism state information and the second printing mechanism state information, and
    wherein in response to selecting, by the command from the computer, the first printing mechanism which is in the printing disabled state, the processor is configured to cause the display to display information on the printing disabled state of the first printing mechanism.

2. The printer according to claim 1,
    wherein the printing disabled state includes a recovery enabled state and a recovery disabled state, and
    wherein the first printing mechanism or the second printing mechanism is in the recovery disabled state, the processor is configured to cause the display to display information on the recovery disabled state of the first or second printing mechanism, regardless of whether the first printing mechanism or the second printing mechanism is selected by the command.

3. The printer according to claim 1,
    wherein the information on the printing disabled state is information on resolution of the printing disabled state.

4. The printer according to claim 1,
    wherein the first printing mechanism state information is first consumable state information indicating the state of a first consumable to be consumed for printing by the first printing mechanism, and
    wherein the second printing mechanism state information is second consumable state information indicating the state of a second consumable to be consumed for printing by the second printing mechanism.

5. The printer according to claim 1,
    wherein the first printing mechanism includes a magnetic ink character recognition head which reads a magnetic ink character on a check as the first media, the second printing mechanism includes a cutter which cuts a roll sheet as the second media, and the processor configured to determine whether the magnetic ink character recognition head in the first printing mechanism and the cutter in the second printing mechanism are in a working enable state as the printing enabled state or a working disabled state as the printing disabled state.

6. A method for controlling a printer including a first printing mechanism capable printing on a first media and a second printing mechanism capable printing on a second media different from the first media, comprising:
    selecting any of the first printing mechanism and the second printing mechanism so that printing is to be executed by the selected printing mechanism;

determining whether the first printing mechanism and the second printing mechanism are in a printing enabled state or a printing disabled state;

in response to selecting, by a command from a computer, the first printing which is in the printing enabled state, causing a display to simultaneously display first printing mechanism state information indicating the state of the first printing mechanism and second printing mechanism state information indicating the state of the second printing mechanism; and in response to selecting, by the command from the computer, the first printing mechanism which is in the printing disabled state, causing the display to display information on the printing disabled state of the first printing mechanism.

7. The method according to claim 6,
wherein the printing disabled state includes a recovery enabled state and a recovery disabled state, and
wherein the method further comprises causing the display to display information on the recovery disabled state of the first or second printing mechanism when the first printing mechanism or the second printing mechanism is in the recovery disabled state, regardless of whether the first printing mechanism or the second printing mechanism is selected by the command.

8. The method according to claim 6,
wherein the information on the printing disabled state is information on resolution of the printing disabled state.

9. The method according to claim 6,
wherein the first printing mechanism state information is first consumable state information indicating the state of a first consumable to be consumed for printing by the first printing mechanism, and
wherein the second printing mechanism state information is second consumable state information indicating the state of a second consumable to be consumed for printing by the second printing mechanism.

10. The method according to claim 6, further comprising:
reading, by a magnetic ink character recognition head of the first printing mechanism, a magnetic ink character on a check as the first media;
cutting, by a cutter of the second printing mechanism, a roll sheet as the second media; and
determining, by a processor, whether the magnetic ink character recognition head in the first printing mechanism and the cutter in the second printing mechanism are in a working enable state as the printing enabled state or a working disabled state as the printing disabled state.

\* \* \* \* \*